Patented Oct. 16, 1928.

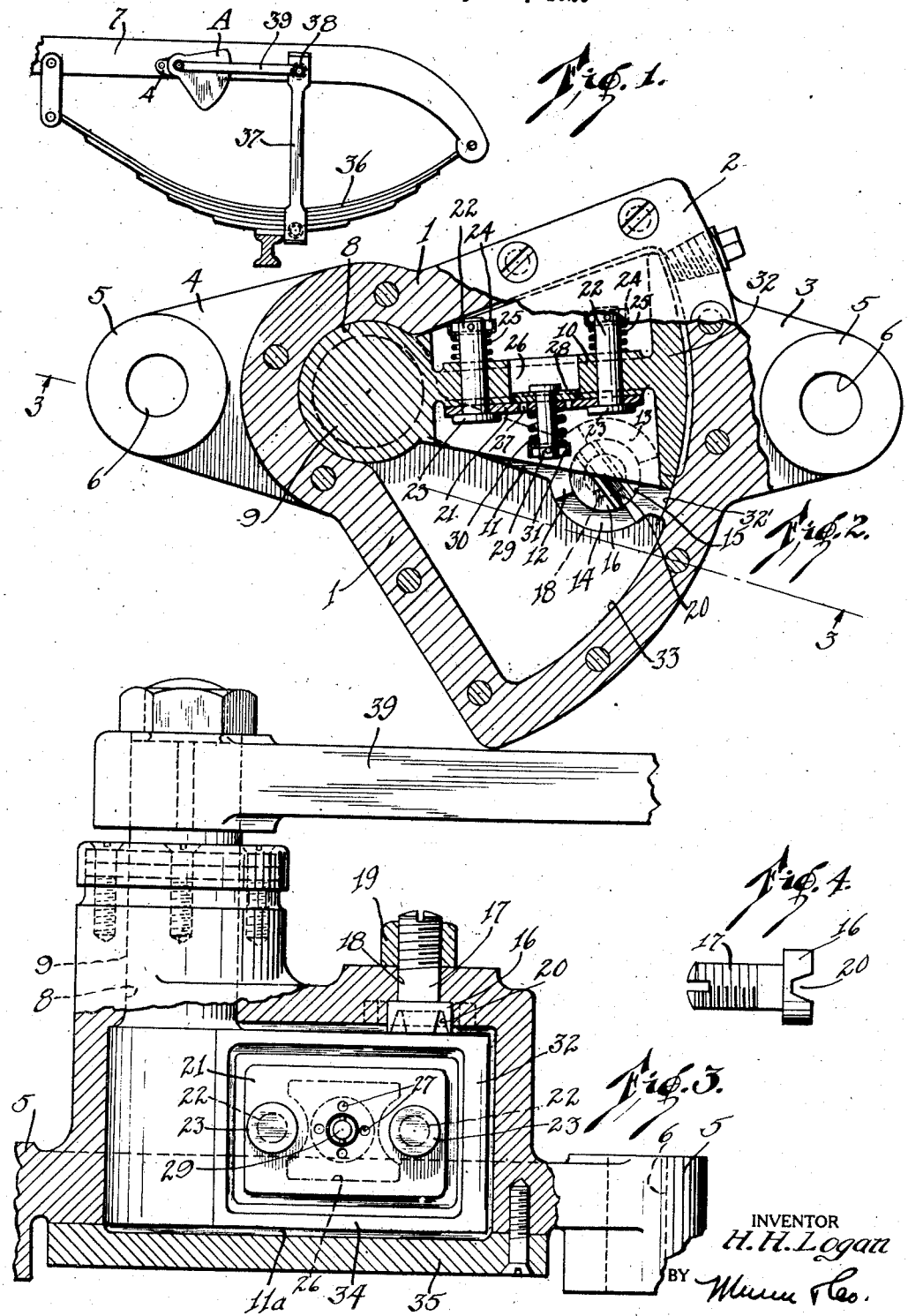

1,687,620

UNITED STATES PATENT OFFICE.

HENRY H. LOGAN, OF CHICAGO, ILLINOIS.

SHOCK ABSORBER.

Application filed September 10, 1926. Serial No. 134,742.

My invention relates to shock absorbers of the hydraulic type, and it consists in the combinations, constructions, and arrangements herein described and claimed.

Shock absorbers of the hydraulic type in which a blade or vane is actuated when an obstruction is encountered on the road that tends to compress the springs of the vehicle, and in which the rebound is checked by fluid which tends to oppose the movement of the vane, ordinarily require considerable machining on the interior in order to make the device operate properly. In certain constructions of this type, it is a costly proceeding to machine the interior, since it is generally of irregular shape.

An object of my invention is to provide a shock absorber of the type mentioned in which the machining of the parts is reduced to a minimum.

A further object of the invention is to provide a relief valve in the main valve of the vane which normally will remain closed, but which under an abnormal pressure will open to relieve the pressure, and thus cause the device to operate smoothly.

A further object of the invention is to provide a device of the type described in which the by-pass has an adjustable regulating member which may be set from the exterior of the casing to permit a greater or a less flow of the fluid therethrough.

A further object of the invention is to provide a shock absorber which is simple in construction, and relatively cheap to manufacture, and at the same time which is strong enough to function properly under all conditions of use.

Other objects and advantages will appear in the following specification, and the novel features of the invention will be particularly pointed out in the appended claims.

My invention is illustrated in the accompanying drawings, forming part of this application, in which Figure 1 is a side view of the device as applied to a vehicle, Figure 2 is a longitudinal sectional view of the device, Figure 3 is a section at right angles to Figure 2 substantially along the line 3—3 of Figure 2, and Figure 4 is a side view of a fluid-flow regulating device.

In carrying out my invention, I provide a casing which I have denoted in general by A, and comprising a casting 1 having a cover plate 2 secured thereto. The casing is substantially fan-shaped and is provided with extensions 3 and 4 having bosses 5 with openings 6 therethrough by means of which the casing is firmly secured to the chassis frame 7 of a vehicle, such as an automobile. At 8, I have shown a cylindrical bore in the casting which is arranged to receive the cylindrical portion 9 of a vane 10. The vane and the shaft are constructed integrally and the latter forms a pivot about the central axis of which the vane may oscillate. The casing has a fan-shaped interior and centrally disposed in this interior is an integral rib 11 which divides the chamber into two compartments. The rib 11 is expanded into a circular boss 12, this boss being provided with cutaway portions 13 and 14, respectively. It is also provided with a recess 15 arranged to receive the head 16 of a fluid regulator. The shank 17 of the fluid-flow regulator extends through an opening 18 and to the outside of the casing where it is held in position by means of a nut 19. This regulator has a slot 20 cut in the head 16, the slot having sloping sides, as will be seen in Figure 4. The arrangement is such that the slot 20 may be turned to register with the cutaway portions 13 and 14, thereby permitting a flow of the fluid from one compartment on one side of the rib 11 to the other. Of course when the slot 20 is turned with its axis parallel with the rib, all flow is shut off, and it may be turned so as to permit any flow desired up to the full diameter of the slot. The purpose of the sloping sides is to give a more gradual opening as the fluid-flow regulator is turned. The regulator is set of course before use at the point where it will permit the proper amount of fluid to pass under given conditions of use.

On one side of the body portion 10 of the vane is a valve. This consists of a plate 21 through which are disposed slidable guide pins 22. One end of the guide pins is fashioned into a head 23, the opposite end being provided with a stop flange 24, and springs 25 being disposed about the guide pins and bearing on one face of the vane. The central portion of the vane has an opening 26. The valve 21 also has openings 27 which are covered normally by a plate 28 held by a pin 29 that has a spring 30 which bears against a stop flange 31 and normally keeps the openings 27 closed. The outer end of the vane 10 is extended laterally to form a bearing shoe 32 which bears on the arc-shaped rib 32' in the inner portion 33 of the casting. The ends of this bearing shoe are extended so that it limits the movement of the vane in either direction. Connecting the shoe with the pivot shaft are side walls 34. These side walls, as well as the arc-shaped surface of the shoe, are machined. One of the side walls bears on the machined surface of the rib 11, and the other is arranged to bear on a rib 11ᵃ carried by a cover plate 35, see Figure 3. When the shoe is at the extreme end of its travel, the edge of the side walls 34 is substantially at the center of the opening 18.

From the foregoing description of the various parts of the device, the operation thereof may be readily understood. It will be noted that in making the casing, there is no necessity of machining the interior of the casting, except, as stated, on the surface of the rib including the arc-shaped surface against which the shoe travels. This cuts down the expense of making the casing, while it provides a virtually fluid-tight contact between the side walls of the vane and the ribs on the casting and cover, so that there is little tendency for the fluid to get from one side of the vane to the other, except through the by-pass, or through the valve.

Consider Figure 1. When an obstruction is reached and the spring 36 is compressed, the arm 37 which is pivotally connected at 38 to the arm 39 secured to the shaft 9, will cause the latter to rotate and to move the vane toward the full line position shown in Figure 2. During this movement, the valve 21 is forced by the liquid to open and the liquid will pass through the central opening 26 easily. When the rebound comes, the valve will close and the liquid must then pass by way of the by-pass from one compartment to the other. Where there is a normal rebound, the valve 28 will remain closed, but in case the pressure becomes too great, then the auxiliary valve will open to permit the flow of the fluid backwardly through the central opening, as well as through the by-pass. Of course, when the pressure is decreased, this auxiliary valve will close and the remainder of the action will be accomplished by the passing of the liquid through the by-pass. It may be necessary at times to vary the effective opening of the by-pass as in cold weather when the oil, if oil is used, gets thicker and opposes more resistance to the flow. This may be done by unloosening the nut 19 and turning the threaded portion of the valve so as to open up the by-pass to any desired extent, and then retightening the nut. This may be done from the exterior without any necessity of opening the casing.

The arrangement described provides a rugged construction which is adjustable for various conditions, and which can be manufactured at a relatively low cost, since the machine work is cut to a minimum.

I claim:

1. In a shock absorber, a casing, a pivot shaft, a vane carried by said pivot shaft, and having a central opening, a valve carried by the vane for controlling the central opening, said valve being movable by fluid pressure when the vane is moving in one direction, and an auxiliary valve carried by the vane and also controlling said central opening and adapted to be operated by an obnormal fluid pressure when the vane is moving in the opposite direction.

2. A shock absorber comprising a fan-shaped casing having inwardly projecting ribs and an arc-shaped end, a pivot shaft, a vane carried by said pivot shaft and having a shoe arranged to contact with the arc-shaped end, and side walls between the shoe and the pivot shaft, said side walls being arranged to bear on the ribs.

3. A shock absorber comprising a fan-shaped casing having inwardly projecting ribs and an arc-shaped end, a pivot shaft, a vane carried by said pivot shaft and having a shoe arranged to contact with the arc-shaped end, side walls between the shoe and the pivot shaft, said side walls being arranged to bear on the ribs, a by-pass extending through one of the ribs, and means for regulating the effective opening of the by-pass.

4. A shock absorber comprising a fan-shaped casing having inwardly projecting ribs and an arc-shaped end, a pivot shaft, a vane carried by said pivot shaft and having a shoe arranged to contact with the arc-shaped end, side walls between the shoe and the pivot shaft, said side walls being arranged to bear on the ribs, a by-pass through one of the ribs, and means for regulating the effective opening of the by-pass, said means comprising a rotatable pin having a slot therethrough arranged to be brought into or out of registration with the portions of the by-pass.

5. A shock absorber comprising a fan-shaped casing having inwardly projecting ribs and an arc-shaped end, a pivot shaft, a vane carried by said pivot shaft and having a shoe arranged to contact with the arc-shaped end, side walls between the shoe and the pivot shaft, said side walls being arranged to bear on the ribs, a by-pass through one of the ribs, means for regulating the effective opening of the by-pass, said means comprising a rotatable pin having a slot therethrough arranged to be brought into or out of registration with the portions of the by-pass, and means for securing the pin in its adjusted position.

6. A hydraulic shock absorber comprising a vane and a casing wherein said vane is pivotally mounted, said casing comprising a dished member and a cover plate, said dished member being provided with an inwardly projecting rib, disposed radially to the axis of the vane, with which rib said vane contacts in all positions to which said vane may be moved.

7. A hydraulic shock absorber comprising a vane and a casing wherein said vane is pivotally mounted, said casing comprising a dished element and a cover plate, said dished element of the casing being provided with an inwardly projecting rib having a concave surface with which the unpivoted end of the vane contacts in all positions to which the vane may be moved.

8. A hydraulic shock absorber comprising a vane and a casing wherein said vane is pivotally mounted, said casing comprising a dished member and a cover plate, said dished member provided with an inwardly projecting rib, disposed radially to the axis of the vane, with which said rib a lateral plane surface of the vane contacts in all positions to which said vane may be moved, said dished member being provided with a second inwardly projecting rib disposed at right angles to the first rib, said second rib provided with a concave surface with which the unpivoted extremity of the vane contacts in all positions to which the vane may be moved.

9. A hydraulic shock absorber comprising a vane and a casing wherein said vane is pivotally mounted, said casing comprising a dished member and a cover plate for the open side of the dished member, said dished member and cover plate being provided with inwardly projecting ribs disposed radially to the axis of the vane, said dished member provided with a third rib disposed at right angles to and connecting the first mentioned ribs, said third rib having a concave inner surface, said ribs contacting with said vane in all positions to which the latter may be moved and cooperating with the vane always to divide the casing into two distinct chambers.

10. A hydraulic shock absorber comprising a vane and a casing wherein the vane is pivotally mounted, said vane provided with a lateral plane surface, at right angles to the vane axis, said casing provided with a rib, radial to the vane axis, with which rib the vane contacts in all positions to which it may be moved, a valve recess in said rib, a transverse slot in the rib intersecting said recess, and a slotted rotary valve member, operable from the exterior of the casing, disposed in said recess, said valve member having its inner surface flush with the inner surface of the rib and being adapted to regulate the flow of fluid through said transverse slot.

11. A hydraulic shock absorber comprising a vane and a casing wherein the vane is pivotally mounted, said vane provided with a lateral plane surface, at right angles to the vane axis, said casing provided with a rib, radial to the vane axis, with which rib the vane contacts in all positions to which it may be moved, a valve recess in the rib, a transverse slot in the rib intersecting said recess, a rotary valve member operable from the exterior of the casing disposed in said recess, said valve member being provided with a slot having converging sides, said slot in the valve member being adapted to be brought more or less into registry with the transverse slot in the rib to regulate the flow of fluid past the rib.

HENRY H. LOGAN.